United States Patent Office 2,990,915
Patented July 4, 1961

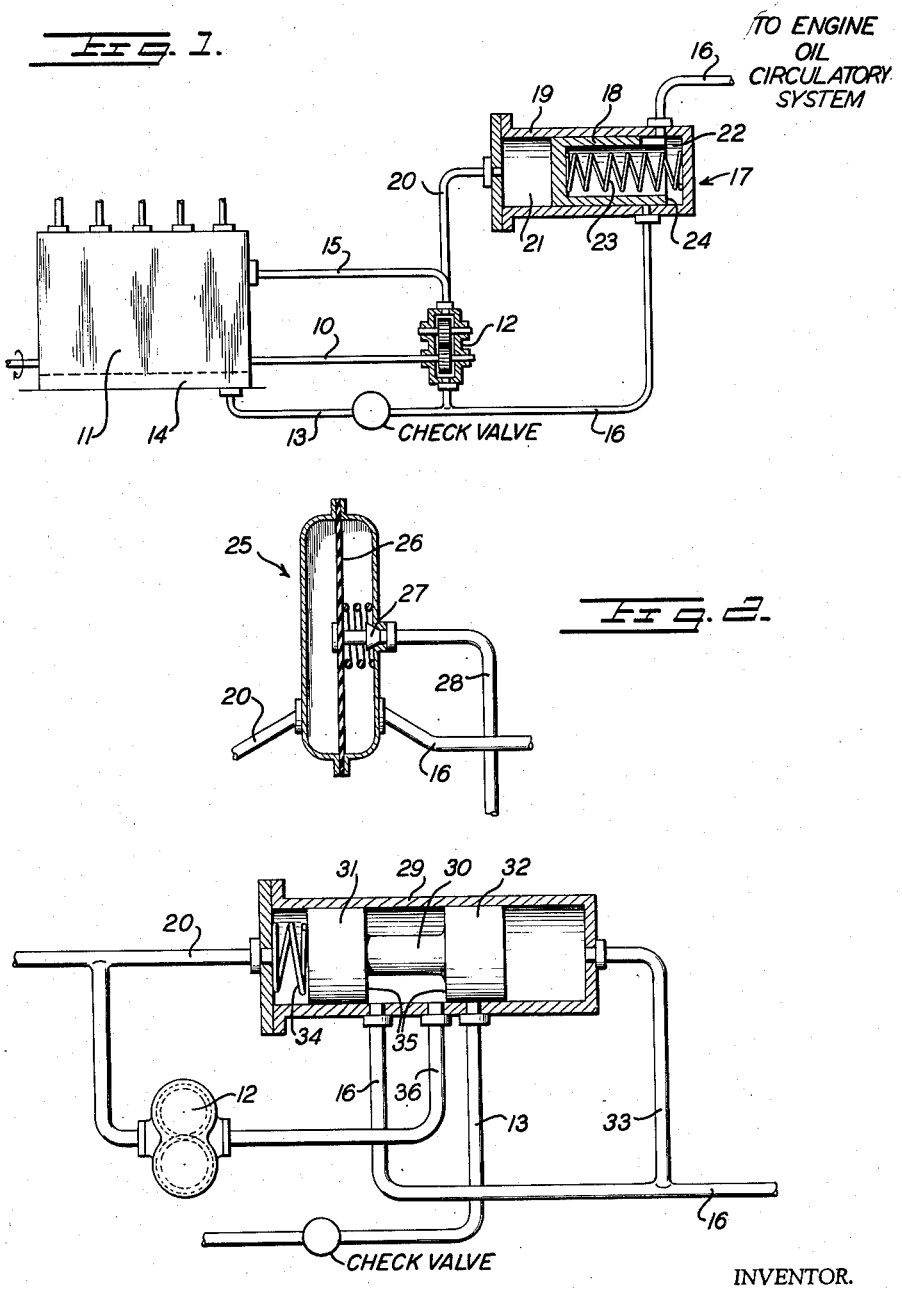
July 4, 1961 — U. W. P. ANDERS — 2,990,915
OIL CONTROL ARRANGEMENT FOR INJECTION TYPE INTERNAL COMBUSTION ENGINES
Filed June 24, 1958
INVENTOR.
ULRICH W. P. ANDERS
BY *Dicke and Craig*
ATTORNEYS

2,990,915
OIL CONTROL ARRANGEMENT FOR INJECTION TYPE INTERNAL COMBUSTION ENGINES
Ulrich W. P. Anders, Stuttgart-Unterturkheim, Germany, assignor to Daimler-Benz Aktiengesellschaft, Stuttgart-Unterturkheim, Germany
Filed June 24, 1958, Ser. No. 744,131
Claims priority, application Germany July 2, 1957
16 Claims. (Cl. 184—6)

The present invention relates to an installation for controlling the oil supply system in fuel injection pumps, especially in gasoline fuel injection pumps for internal combustion engines provided with an oil supply or feed pump coordinated or operatively connected with the injection pump.

It is known in the prior art to coordinate or operatively connect a separate oil supply or feed pump with the fuel injection pump of an internal combustion engine to maintain adequate circulation of the oil. The oil may then be used simultaneously as sealing oil for sealing the pump pistons and as lubricating oil. The supply and control of this oil circulatory system is of great importance and significance, among others, also by reason of the fact that with too slight a circulation of the oil, the sealing oil pressure drops and fuel losses or a corresponding thinning of the oil in the circulatory system may result therefrom.

The present invention seeks to provide an installation for controlling the quantity of the oil circulation. According to the present invention, the problems arising therein are solved in connection with injection pumps of the type mentioned hereinabove in that the oil circulatory system of the injection pump is connected with the oil circulatory system of the internal combustion engine over any suitable blocking or closure member, for example, by a valve, a sliding member or the like, and in that opening and closing of this blocking or closure member, for example, of the valve, sliding member or the like, is adapted to be controlled in dependence on the supply of the oil feed pump associated with the injection pump. In connection therewith, it may be appropriate to provide a connecting line or conduit from the suction line of the feed pump to the oil circulatory system of the internal combustion engine and to arrange in this connecting line or conduit the closure member which may be in the form, for example, of a valve of suitable construction or the like.

According to one embodiment in accordance with the present invention, the closure member, for example, a valve member or the like, may be provided, for purposes of controlling the movement thereof, with auxiliary piston surfaces which are loaded or acted on by the oil circulatory system of the injection pump and that of the internal combustion engine. The closure member arranged in the connecting line or conduit may be constructed also as spool or slide valve member, the end faces of which form the auxiliary piston surfaces, and which controls with a control edge thereof either directly or indirectly the cross section of the connecting line or conduit.

However, it is also understood that the construction may be made in such a manner that the closure member arranged in the connecting line or conduit may be constructed as a membrane-type pressure box loaded or acted on both sides thereof by the hydraulic pressure medium whereby the membrane controls directly or indirectly the cross section of the connecting line.

With all of these embodiments, it may be appropriate to coordinate or operatively connect a spring, which may be made adjustable, with the closure member, for example, with the valve member, for purposes of maintaining a pressure difference, preferably on the side thereof corresponding to the oil circulatory system of the internal combustion engine. The adjustable spring may be constructed, for example, as coil spring and may be arranged within a pot-shaped piston-like slide valve member.

Furthermore, it may be advantageous under certain circumstances to construct the line between the oil reservoir, for example, the oil sump in the injection pump, and the oil feed pump to be automatically blocked off or closed during opening of the connecting line or conduit.

The installation according to the present invention assures a quantity of oil in the circulatory system of the injection pump, which is at all times sufficient and adequate, by automatically supplying or feeding to this circulatory system, for example, in case of leakage losses, oil from the engine oil circulatory system and thereby replenishing the same in case of need with supplemental quantities of oil. Consequently, a failure of the injection pump, as well as also in particular of the oil seal, as a result of lack of sufficient quantity of oil, is rendered practically impossible.

Accordingly, it is an object of the present invention to provide a control system for injection type internal combustion engines which assures under all circumstances a sufficient supply of oil for the injection pump.

Another object of the present invention is the provision of a control system and arrangement whereby failure of the injection system of the internal combustion engine caused by inadequate quantities of oil supplied to the injection pump is rendered practically impossible.

Still another object of the present invention is the provision of a control system for controlling the supply of oil to the injection pump of an internal combustion engine by automatically adjusting the connection between the engine-oil-circulatory system and the injection pump oil circulatory system in such a manner that with a drop of the pressure in the latter system, for any reason whatsoever, oil is taken from the former system to supplement the oil in the latter system.

These and other objects, features and advantages of the present invention will become more obvious from the following description when taken in connection with the accompanying drawing, which shows, for purposes of illustration only, several embodiments in accordance with the present invention, and wherein:

FIGURE 1 is a schematic view, partially in cross section of the overall installation of an oil control system for an injection pump of an internal combustion engine in accordance with the present invention, FIGURE 2 is a cross-sectional view, on an enlarged scale, of a blocking or closure member used in connection with the control system of the present invention, and FIGURE 3 is a cross-sectional view, on an enlarged scale, of still another embodiment of a blocking or closure member in accordance with the present invention.

Referring now to the drawing, wherein like reference numerals are used throughout the various views to designate like parts, and more particularly to FIGURE 1 thereof, reference numeral 10 designates the shaft of the injection pump 11 on which is directly mounted the oil supply or feed pump 12 for the oil circulatory system of the injection pump 11. However, it is also understood that instead of being directly mounted on shaft 10, the oil feed pump 12 may be operatively connected therewith in any other suitable manner. Furthermore, the feed pump 12 may also be combined constructionally with the housing of the injection pump 11 so as to form a unitary assembly therewith. The feed pump 12 draws in oil over suction line 13 from the oil sump 14 of the injection pump 11 or from any other oil reservoir, and forces the oil over feed line 15 into the oil circulatory system, i.e., to the lubricating points and/or as sealing oil to the pump pistons for purposes of sealing the same.

A connecting line or conduit 16 leads from the suction line 13 to the engine circulatory system which is not shown in the drawing. The connecting line 16 serves in accordance with the present invention, as will be described more fully hereinafter, for purposes of controlling the oil supply for the injection pump system. A blocking or closure member generally designated by reference numeral 17 is provided or interconnected in the connecting line 16 which member 17 may also be combined into a constructional unit with the injection pump 11.

The closure member 17 is constructed as a slide-valve piston member and consists of a pot-shaped piston 18 which is arranged within the cylinder 19.

The movement of the piston 18 is controlled by the end faces thereof which are loaded or acted on by both oil circulatory systems. A line 20 connects the pressure side of the feed pump 12 with the cylinder space 21 disposed to one side of piston 18. The cylinder space 22 disposed on the other side of piston 18 is in communication over connecting line 16 with the oil circulatory system of the engine (not shown), on the one hand, and with the suction line 13 of the feed pump 12, on the other. The piston 18 is subjected to a pretension or preloading by means of a spring 23 which is preferably adjustable and constructed, for example, as coil spring, and which may be arranged within piston 18. As a result of such an arrangement, a constant pressure difference is assured between the two oil circulatory systems. In the embodiment described in connection with FIGURE 1, the oil pressure in the circulatory system 15, 20 of the injection pump is always higher than the pressure in the engine oil circulatory system present in connecting line 16.

*Operation*

Normally the piston 18 is kept in the right end position thereof as viewed in FIGURE 1 by the oil pressure from oil feed pump 12 which is operatively connected with the cylinder space 21 through line 20 and thereby closes with the control edge 24 thereof the connecting line 16 interconnecting the oil circulatory systems of the injection pump and the engine. If, for any reason whatsoever, the oil supply pump 12 does not supply any longer a sufficient quantity of oil, then the pressure in the cylinder space 21 drops correspondingly. As a result thereof, the oil pressure in the engine oil circulatory system together with the spring 23 predominates so that the piston 18 moves toward the left until the control edge 24 opens or releases the connecting line 16. By such leftward movement of piston 18, additional oil from the engine oil circulatory system is permitted to flow to the suction side of the pump 12 so that the latter may again supply more oil. The pressure increase caused thereby on the pressure side of the oil supply pump 12 and therewith also in the cylinder space 21 moves the piston 18 again into the initial position thereof, i.e., again toward the right and thereby again closes the line 16.

Several modifications or changes in accordance with the present invention are possible in the system of FIGURE 1. For example, it would also be possible to arrange in the suction line 13, leading from the oil sump 14 to the supply or feed pump 12, a check valve in order to prevent that any of the oil or a large part thereof which flows from the engine circulatory system into the pump circulatory system when valve 17 is opened, may flow off over line 13 into the oil sump 14.

FIGURE 2 shows another embodiment of the blocking or closure member in accordance with the present invention adapted to be disposed in the connecting line 16. In FIGURE 2, the closure member is constructed as pressure box generally designated by reference numeral 25 in which a membrane member 26 is arranged. This membrane member 26 is acted on one side thereof by the pressure of the oil supplied over line 20 from the supply or feed pump 12 whereas the other side of the membrane member 26 is connected with the interconnecting line 16. A valve piston 27 or similar closure member is secured to the membrane 26 or is operatively connected therewith in any suitable manner which is adapted to close the section 28 of the connecting line 16 leading to the supply pump 12 and corresponding to the section of the connecting line 16 of FIGURE 1 leading from closure member 17 to supply pump 12. It is also possible in the embodiment of FIGURE 2 to provide a spring which may be operatively connected or coordinated to the membrane member 26.

*Operation*

The operation of the device of FIGURE 2 corresponds to that described hereinabove in connection with FIGURE 1. Depending on the pressure conditions in the circulatory system of the engine and injection pump the line section 28 of the connecting line 16 is selectively opened or closed by the valve piston 27 so that, if need be, oil may flow into the circulatory system of the injection pump from the engine oil circulatory system.

As already mentioned hereinabove, it is advantageous to automatically block off the line 13 from the oil sump 14 of the injection pump to the supply or feed pump 12 as soon as the connecting line 16 is opened. The means or device necessary therefor may be combined with the closure member disposed in the connecting line 16 in such a manner that the suction line 13 of the supply pump 12 is selectively connected either with the oil sump 14 of the injection pump 11 or with the oil circulatory system of the internal combustion engine. Such an arrangement is illustrated in detail in FIGURE 3.

In FIGURE 3, a piston 30 having two piston parts or lands 31 and 32 is arranged in a cylinder 29 which may be combined with the housing of the injection pump 11 and which is effective as a change-over valve. The outer end surfaces of the piston parts 31 and 32 are acted on, on the one hand, over line 20 by the oil pressure in the oil circulatory system of the injection pump and, on the other, over line 33 by the oil pressure in the oil circulatory system of the engine. In the embodiment of FIGURE 3, a spring 34 may also be provided which in this case is disposed on the side of the injection pump circulatory system and therewith assures that the pressure in the circulatory system of the injection pump is lower than the pressure prevailing in the engine circulatory system.

The piston parts 31 and 32 control with the control edges 35 thereof the suction line 36 leading to the supply or feed pump 12 in such a manner that the suction line 36 is alternately connected with the line 13 connected with the oil sump 14 of the injection pump 11 or with the line 16 connected with the oil circulatory system of the engine. In the position indicated in the drawing, a communication exists between the suction line 36 of the oil pump 12 and the connecting line 16 leading to the engine circulatory system. If the pressure in the circulatory system of the injection pump 11 increases, then the piston 30 is moved toward the right. As a result of such rightward movement, the line 16 is closed and in place thereof the line 13 leading to the oil sump 14 of the injection pump 11 is opened. Consequently, the normal oil circulatory system of the injection pump is reestablished and will be maintained for such length of time until a pressure decrease again occurs therein for any reason causing a corresponding pressure decrease in the line 20 so that the oil pressure of the engine oil circulatory system moves the piston 30 again toward the left into the position thereof shown in the drawing.

While I have shown and described several embodiments in accordance with the present invention, it is understood that the same is not limited thereto but is susceptible of many changes and modifications within the spirit and scope of the present invention, and, I, therefore, intend to cover all such changes and modifications as are encompassed by the scope of the appended claims.

I claim:

1. An installation for controlling the sealing and lubricating oil supply of an injection pump, especially of a gasoline injection pump for an internal combustion engine having an engine oil circulatory system, comprising injection pump means, sealing and lubricating oil feed-pump means, conduit means forming an injection pump oil circulatory system and connecting said oil feed-pump means with said injection pump means, and connecting means connecting said injection pump oil circulatory system with said engine oil circulatory system including closure means for selectively controlling the flow between said systems and means for operating said closure means in response to the output flow of said sealing and lubricating oil feed-pump means.

2. An installation according to claim 1, wherein said closure means is a valve member.

3. An installation according to claim 1, wherein said closure means is a slidable control member.

4. An installation for controlling the quantity of the sealing and lubricating oil supply of an injection pump, especially of a gasoline injection pump for an internal combustion engine having an engine oil circulatory system, comprising injection pump means, sealing and lubricating oil supply pump means, means forming an injection pump oil circulatory system and connecting said oil supply pump means with said injection pump means including a suction line, and connecting line means connecting said suction line with said engine oil circulatory system including closure means for selectively controlling the flow between said systems, and means for operating said closure means in response to the output pressure of said sealing and lubricating oil supply pump means.

5. An installation according to claim 4, further comprising check valve means in said suction line to prevent any large flow of oil from said engine oil circulatory system to said suction line.

6. An installation for controlling the sealing and lubricating oil supply of an injection pump, especially of a gasoline injection pump for an internal combustion engine having an engine oil circulatory system, comprising injection pump means, sealing and lubricating oil supply pump means, means forming an injection pump oil circulatory system and connecting said oil supply pump means with said injection pump means, and connecting means connecting said injection pump oil circulatory system with said engine oil circulatory system including closure means provided with piston end face means for selectively controlling the flow between said systems, and means operatively connecting said piston end face means with said injection pump and said engine oil circulatory systems to operate said closure means in response to the respective oil pressures prevailing therein.

7. An installation according to claim 6, wherein said closure means includes a piston-like slide-valve-member provided with a control edge formed by said piston end face means, said slide valve member controlling the flow through said connecting means with said control edge.

8. An installation according to claim 1, wherein said means for operating said closure means is a membrane pressure box having resilient membrane means for controlling the flow through said connecting means.

9. An installation according to claim 8, further comprising spring means operatively connected with one side of said membrane means to normally maintain a pressure difference between said circulatory systems.

10. An installation according to claim 1, further comprising preloading means operatively connected with said closure means to maintain normally a difference of pressure between said circulatory systems.

11. An installation according to claim 10, wherein said preloading means is operative to normally maintain the pressure of said injection pump circulatory system higher than that of said engine circulatory system.

12. An installation according to claim 6 further comprising spring means preloading one of said piston end face means to normally maintain a predetermined pressure difference between said two circulatory systems.

13. An installation according to claim 12, wherein said closure means includes a pot-shaped piston member accommodating on the inside thereof said spring means.

14. An installation for controlling the sealing and lubricating oil supply of an injection pump, especially of a gasoline injection pump for an internal combustion engine provided with an engine oil circulatory system, comprising injection pump means with a sump, sealing and lubricating oil supply pump means, means forming an injection pump oil circulatory system and connecting said oil supply pump means with said injection pump means including conduit means operatively connecting said sump with the input of said pump means, and connecting means connecting said injection pump oil circulatory system with said engine oil circulatory system including closure means for selectively controlling the flow between said systems, means for operating said closure means in response to the output flow of said sealing and lubricating oil supply pump means, and automatic valve means automatically blocking off said conduit means upon unlocking said connecting means by said closure means.

15. An installation according to claim 14, wherein said automatic valve means is a check valve.

16. An installation according to claim 14, wherein said automatic valve and said closure means are constructed as a single spool-type piston-like slidable valve member having two piston parts, the end faces of said piston parts being operatively connected with a respective one of said circulatory systems, said injection pump oil circulatory system including a suction line leading from between the two piston parts of said valve member to said supply pump means, and said conduit means and said engine oil circulatory system each including a conduit leading to said valve member, said conduits being arranged on opposite sides of said suction line and said two piston parts being so constructed and arranged that the inner control edges thereof valve the connections of said conduits with said suction line.

References Cited in the file of this patent

UNITED STATES PATENTS

| | | |
|---|---|---|
| 1,256,754 | White | Feb. 19, 1918 |
| 1,370,641 | Grant | Mar. 8, 1921 |
| 1,647,135 | Johnson | Nov. 1, 1927 |
| 2,384,012 | Bremser | Sept. 4, 1945 |
| 2,440,371 | Holley | Apr. 27, 1948 |
| 2,871,981 | Baits | Feb. 3, 1959 |